(12) United States Patent
Auclair

(10) Patent No.: US 10,059,307 B2
(45) Date of Patent: Aug. 28, 2018

(54) WIPER SYSTEM FOR A VEHICLE THAT DISENGAGES IN THE EVENT OF TORQUE EXCEEDING A THRESHOLD

(71) Applicant: Valeo Systèmes d'Essuyage, Le Mesnil Saint Denis (FR)

(72) Inventor: Guillaume Auclair, Cournon (FR)

( * ) Notice: Subject to any disclaimer, the term of this patent is extended or adjusted under 35 U.S.C. 154(b) by 0 days.

(21) Appl. No.: 15/318,888

(22) PCT Filed: May 19, 2015

(86) PCT No.: PCT/EP2015/060952
§ 371 (c)(1),
(2) Date: Dec. 14, 2016

(87) PCT Pub. No.: WO2015/193044
PCT Pub. Date: Dec. 23, 2015

(65) Prior Publication Data
US 2017/0120870 A1    May 4, 2017

(30) Foreign Application Priority Data

Jun. 16, 2014 (FR) ..................................... 14 55458

(51) Int. Cl.
*B60S 1/34* (2006.01)
*F16D 7/04* (2006.01)

(52) U.S. Cl.
CPC ............. *B60S 1/342* (2013.01); *B60S 1/3436* (2013.01); *B60S 1/3459* (2013.01); *F16D 7/048* (2013.01)

(58) Field of Classification Search
CPC .... B60S 1/3459; B60S 1/3461; B60S 1/3436; B60S 1/3443; B60S 1/342; B60S 1/34; F16D 7/042; F16D 7/048

USPC .......................................... 15/250.34, 250.31
See application file for complete search history.

(56) References Cited

U.S. PATENT DOCUMENTS

| 6,026,536 A * | 2/2000 | Miller ....................... B60S 1/18 |
| | | 15/250.13 |
| 2008/0022475 A1* | 1/2008 | Laurens ................... B60S 1/342 |
| | | 15/250.21 |

FOREIGN PATENT DOCUMENTS

| DE | 25 29 702 A1 | 1/1977 |
| DE | 102012201287 A1 | 8/2013 |
| FR | 2379408 A1 | 9/1978 |
| FR | 2931761 A1 | 12/2009 |
| FR | 2931762 * | 12/2009 |
| GB | 743720 * | 1/1956 |

(Continued)

OTHER PUBLICATIONS

Machine translation of description portion of Japanese publication 62-273147, published Nov. 1987.*

(Continued)

Primary Examiner — Gary Graham
(74) Attorney, Agent, or Firm — Osha Liang LLP

(57) ABSTRACT

The invention relates to a drive mechanism and a wiper system for a vehicle. The mechanism comprises a coupling member (22), a drive head (10) having means (20) for connecting to a wiper blade arm (48) and a slide (32) arranged so as to rotatably engage the member with the head when a value of a torque applied to the head relative to the member is less than a predetermined threshold, and, when this is not the case, to rotatably disengage the member and the head by sliding in a direction perpendicular to a rotational axis of the member.

12 Claims, 11 Drawing Sheets

(56) References Cited

FOREIGN PATENT DOCUMENTS

JP         62-273147    * 11/1987
JP         2010-89574    * 4/2010

OTHER PUBLICATIONS

Machine translation of description portion of French publication 2931762, published Dec. 2009.*
International Search Report issued in corresponding application No. PCT/EP2015/060952 dated Aug. 3, 2015 (4 pages).
Written Opinion of the International Searching Authority issued in corresponding application No. PCT/EP2015/060952 dated Aug. 3, 2015 (5 pages).
International Preliminary Report on Patentability issued by the National Institute of Industrial Property in corresponding application No. FR1455458 dated Jun. 16, 2014 (7 pages).

* cited by examiner

WIPER SYSTEM FOR A VEHICLE THAT DISENGAGES IN THE EVENT OF TORQUE EXCEEDING A THRESHOLD

The invention relates to the field of wiper systems for a glass surface of a motor vehicle.

A system of this type comprises a motor with an output shaft which drives in alternating rotation, by means of a drive mechanism, a wiper-holder arm which is protected by a housing.

The wiper system can be subjected to substantial mechanical stresses. Firstly, it can encounter various obstacles on the glass surface. These obstacles modify the calculated trajectory of the arm, and thus subject the wiper system to stresses. By way of example, these obstacles can be: part of a cycle carrier, or frost or snow accumulated on the glass. Secondly, even when the wiper system is not functioning, it can be subjected to certain mechanical stresses. Snow can accumulate on the system, the system can be subjected to a high-pressure water jet when the vehicle is cleaned, or a person, for example a child, can exert significant pressure on the wiper-holder arm.

These mechanical stresses can damage the wiper system and make it inoperative. The wiper-holder arm can be deformed or even break, even though it is protected by a housing. The arm drive mechanism can also become definitively unusable, such that it must be replaced. The same applies to the drive motor of the wiper-holder arm. Since the drive motor and the arm have smaller dimensions in the case of a rear window wiper system, a system of this type is particularly liable to be damaged.

There is known from application FR-2 931 761 a drive mechanism for a wiper system for a glass surface which can be disengaged in rotation from the wiper-holder arm when the stresses undergone by the arm exceed a certain threshold. This mechanism comprises two rings and a resilient unit. However, this mechanism is added to the parts which are habitually provided in a wiper system, and it has a relatively large size.

An objective of the invention is to propose a drive mechanism which can disengage a wiper system if the system is subjected to torque which exceeds a certain threshold, and which mechanism is smaller.

For this purpose, the subject of the invention is a drive mechanism for a wiper system for a vehicle, comprising:
  a coupling unit;
  a drive head comprising means for connection to a wiper-holder arm; and
  a slide which is designed such that it engages the unit and the head in rotation when a torque value applied to the head relative to the unit is lower than a predetermined threshold, and disengages them in rotation in the opposite case by sliding in a direction perpendicular to an axis of rotation of the unit.

Thus, a single part, i.e. the slide, ensures the engagement in rotation of the coupling unit and the head. Also, the orientation of sliding of the slide makes it possible to obtain a wiper system which can be disengaged and has a reduced size.

In addition, the wiper system can be easily re-engaged after it has been disengaged as a result of the action of torque with a value which exceeds the threshold. Another advantage is that it can be adapted to a standard shaft of a wiper system drive motor.

Advantageously, the slide has a receptacle for receipt of the coupling unit.

Preferably, the coupling unit and the slide form a male-female assembly which can give rise to sliding of the slide by means of a ramp effect.

According to one embodiment, the unit comprises a main body which can give rise to the sliding of the slide by means of a ramp effect.

This arrangement is robust, since minimum damage to the assembly does not prevent the mechanism from functioning.

Advantageously, the unit is formed by an insert which can be connected to a shaft of a motor.

It is thus not necessary to make the shaft cooperate directly with the slide.

Preferably, either one of the unit and the slide has a relief and the other one of the unit and the slide has a cavity for receipt of the relief, the relief and the cavity having faces which are designed to give rise to the sliding of the slide by means of a ramp effect.

This arrangement is reliable, simple, and has a small size.

According to one embodiment, the insert contains the cavity.

Advantageously, the part which comprises the relief has a flat main face, with the relief extending projecting from this face according to the direction of the axis of rotation.

Thus, the coupling surface between the relief and the cavity is larger.

Preferably, the relief comprises a tooth.

The invention also relates to a wiper system for a vehicle comprising a drive motor, a wiper-holder arm and a drive mechanism connecting the motor and the arm according to the invention.

Preferably, the slide is connected to the wiper-holder arm by a spring which tends to engage the unit and the slide in rotation.

Thus, the return force of the spring participates in retaining the slide in the engaged position. In addition, this same spring can be used in order to retain the wiper blade against the glass surface.

Advantageously, the motor comprises an output shaft which forms the coupling unit.

The size of the wiper system is thus reduced, and the simplicity of the system is improved, since the output shaft cooperates directly with the slide.

A description will now be provided, by way of non-limiting example, of four embodiments relating to the following figures.

A first embodiment of the invention will be described with reference to FIGS. 1 to 15. The wiper system comprises a drive motor, not illustrated, comprising an output shaft. It also comprises a wiper-holder arm and a mechanism to drive the arm connecting the shaft and the arm.

Figure 1:
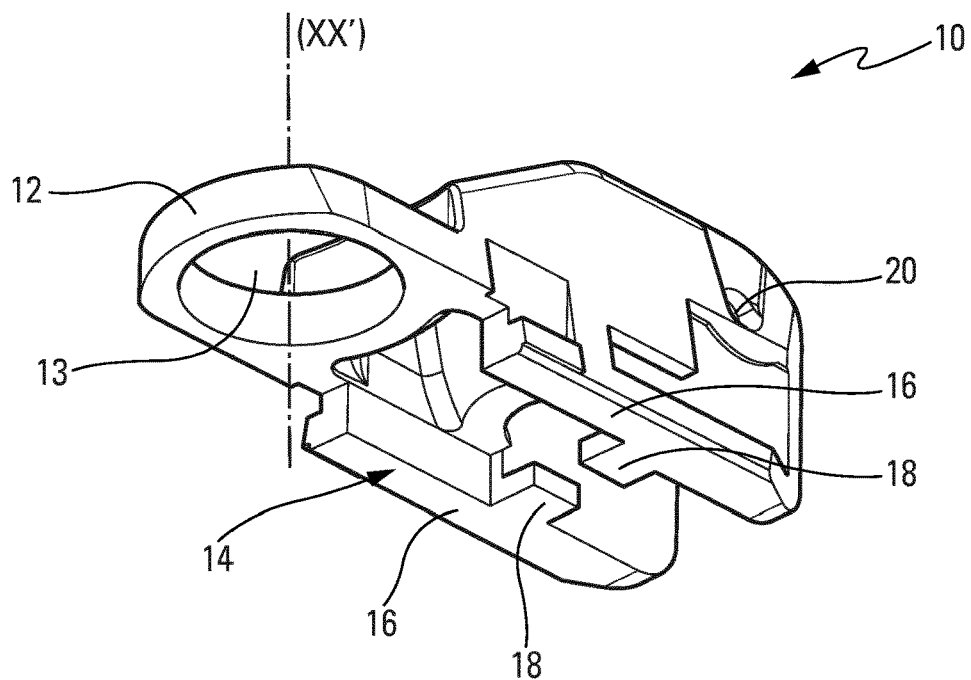
FIGS. 1, 2 and 3 are views in perspective respectively of a drive head, a coupling insert and a slide according to a first embodiment.
Figure 2:
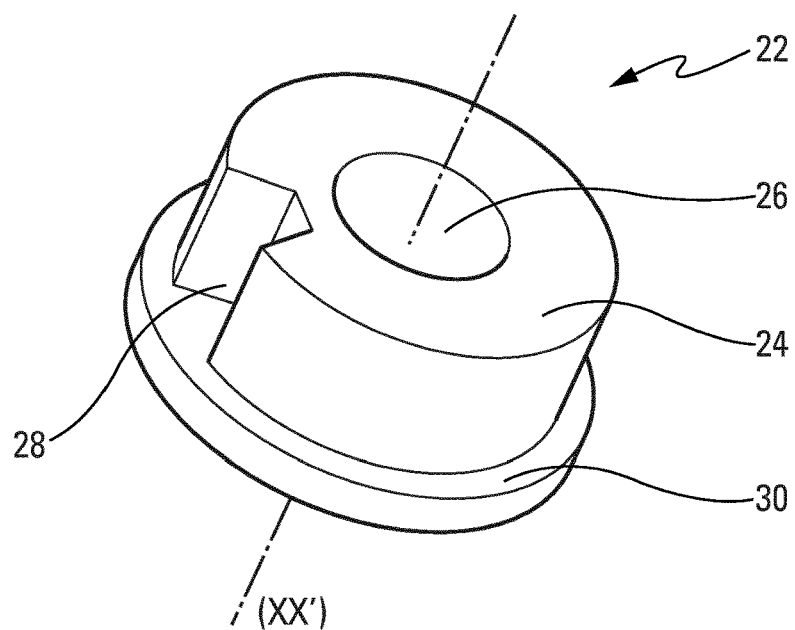
Figure 3:
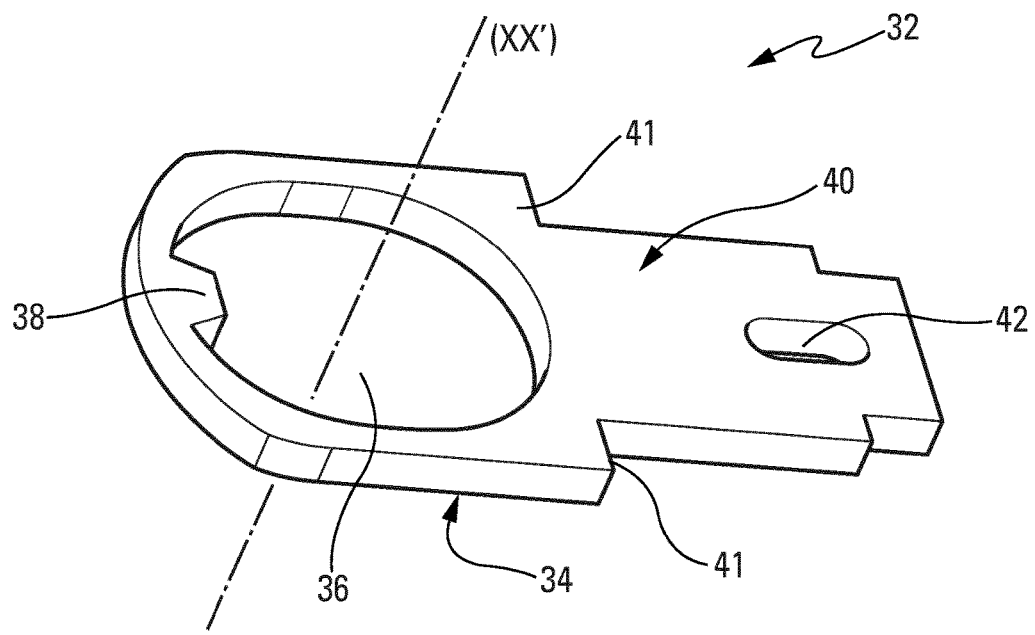

In particular, the mechanism comprises a drive head 10, a coupling unit, in this case an insert 22, which is fitted such as to be mobile in rotation relative to the head, and a slide 32 illustrated respectively in FIGS. 1 to 3.

The head 10 has a hollow circular part 12, the edges of which form a circular reception receptacle 13 for the insert and the shaft. This receptacle has an axis (XX') around which the shaft can perform an alternating rotation. The head 10 also comprises a support 14 which is designed to receive the slide fitted such as to be slidably mobile relative to the head. The direction of sliding is perpendicular to the axis (XX'). The support comprises two lugs 16 which have dimensions such that they grip the slide and two appendages 18 which extend perpendicularly to the lugs 16, and are such that they can retain the slide against the lower part of the head 10. The lugs 16 ensure the guiding of the slide during the sliding.

The head 10 also has means for connection to the wiper-holder arm. These means comprise two coaxial circular openings 20 which are situated in two opposite flanks of the head 10. These openings 20 are designed to receive a screw or a securing shaft making it possible to establish a connection in rotation of the arm with the head, around an axis orthogonal to the axis (XX'). This rotation is used in particular when the user wishes for example to move the wiper away from the glass. The drive head can be made of material such as a plastic material or a metal.

The insert 22 has a general form with symmetry of revolution around the axis (XX'). It has a central receptacle 26 with a cylindrical form and a circular cross-section for receipt of the motor shaft and rigid securing to the latter. The insert 22 additionally has an outer face with a cylindrical form and a circular cross-section in which a cavity such as a groove 28 is provided, designed to receive a tooth of the slide, as will be seen hereinafter. The cavity has two flat faces which are non-parallel to one another, are opposite to one another, and diverge in a direction opposite to the axis (XX'). At its base the insert 22 also has a circular part 30 with a diameter wider than that of the outer face.

The slide 32 has a generally flat form delimited by two opposite parallel flat main faces 34 and 40. It has an oblong opening which forms a receptacle 36 for receipt of the insert. The circular part also bears on its entire thickness a relief such as a coupling tooth 38 which extends projecting from the edge of the part in the direction of the center of the receptacle 36. The relief does not extend beyond the thickness of the part. The slide additionally has a solid part 40 adjacent to the circular part, and forming together with this part two stop shoulders 41. The solid part 40 also comprises a means for connection to a wiper-holder arm. In this case this means is an orifice 42.

The insert 22 and the slide 32 are made of materials which can slide easily relative to one another. Reference can be made to the following non-limiting associations: the insert and the slide comprise steel, the insert comprises steel and/or aluminum and the slide comprises a polymer material, the insert comprises zamac and the slide comprises a polymer material or aluminum.

FIGS. 5 to 13 illustrate the mechanism in the engaged position.

Figure 5:
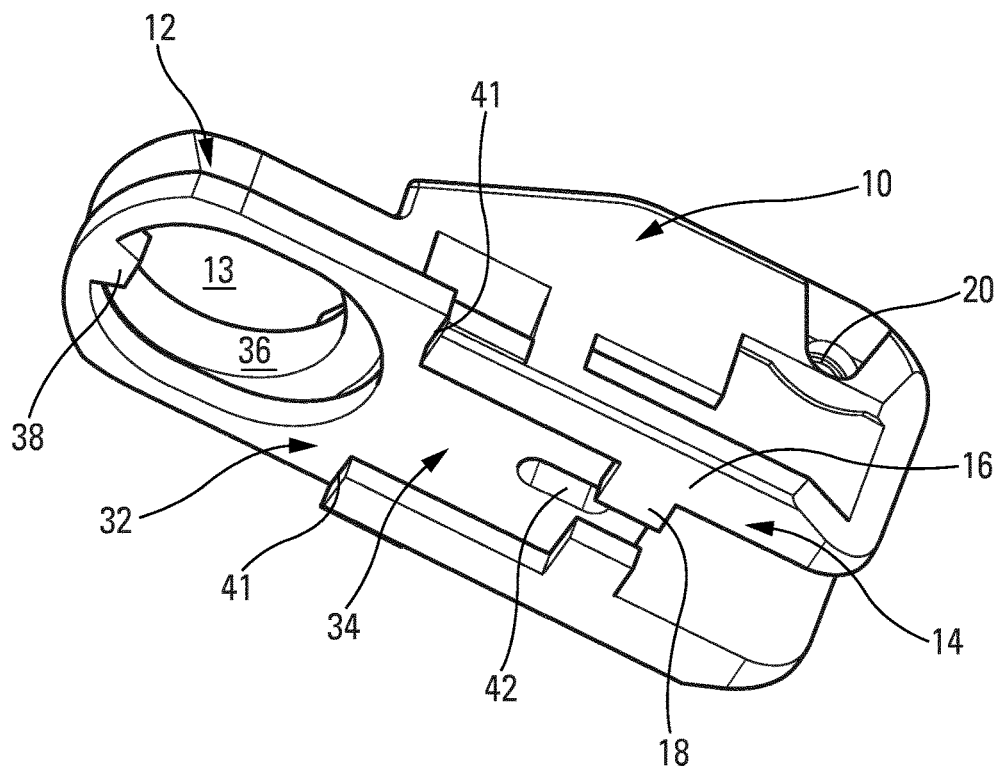

As shown in FIG. 5, the slide 32 has dimensions such that the lateral edges of the part 40 are gripped by the two lugs 16 of the head 10. These lugs also ensure the guiding with sliding of the slide. The two appendages 18 extend perpendicularly to the lugs 16, but without obstructing the orifice 42 in the slide 32. The lugs 16 can abut the shoulders 41, which thus define an end-of-course position for the sliding of the slide relative to the head, when the slide goes from the disengaged position to the engaged position.

In the engaged position, the slide 32 is retained against the lower part of the drive head 10 by the two appendages. The receptacle 13 in the head extends entirely opposite that 36 in the slide and opposite the tooth. The latter is large enough to extend projecting from the edge of the circular part 12 of the head 10. The inner circular edges of the receptacles in the slide and the head, on the side opposite the support, coincide. The slide 32 does not extend projecting from the head on the side opposite the support 14.

Figure 6:
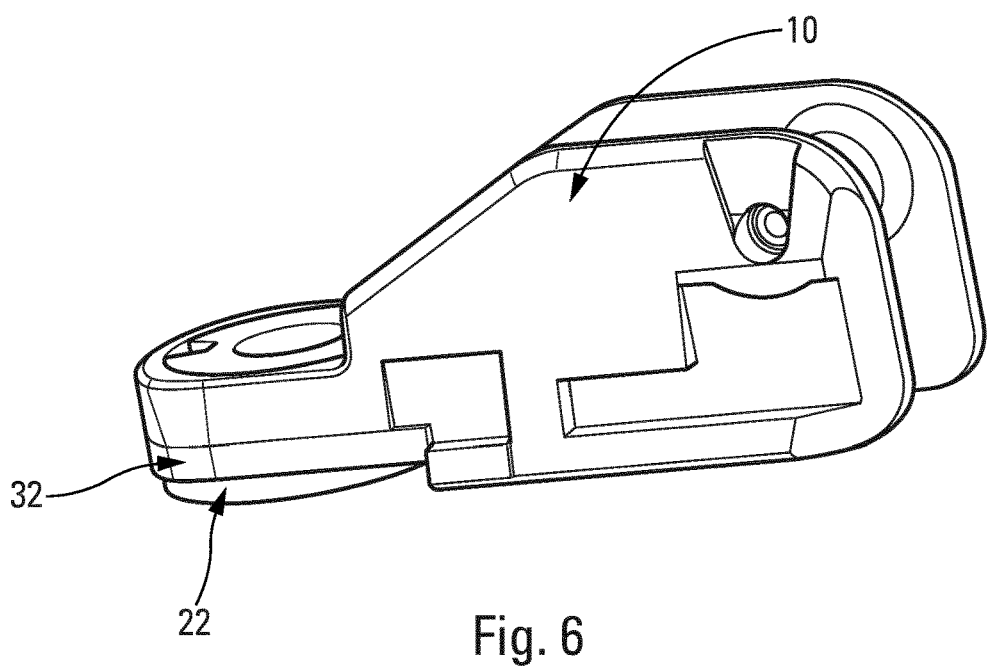
FIGS. 6 to 10 are views in perspective of the head, of the slide, and of the insert assembled.
Figure 7:
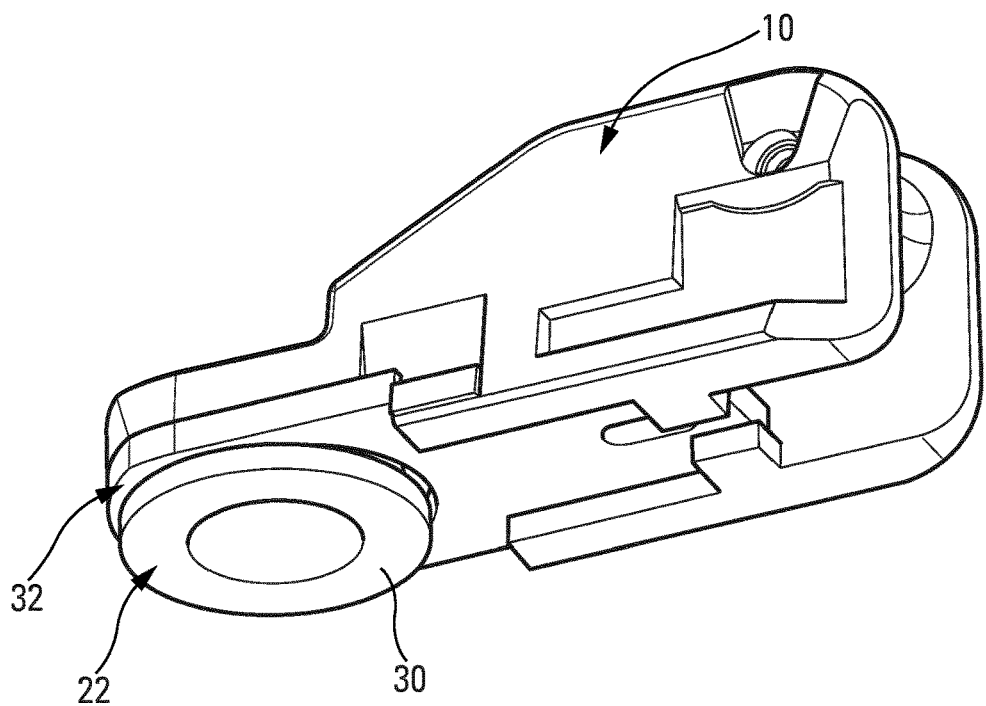

As illustrated in FIGS. 6 and 7, the insert 22 is received in the receptacles 13 and 36 in the head 10. Thus, the circular part 34 of the slide 32 is trapped between the base 30 of the insert 22 and the head 10. The slide 32 is also retained by the pairs of lugs 16 and appendages 18.

Figure 8:
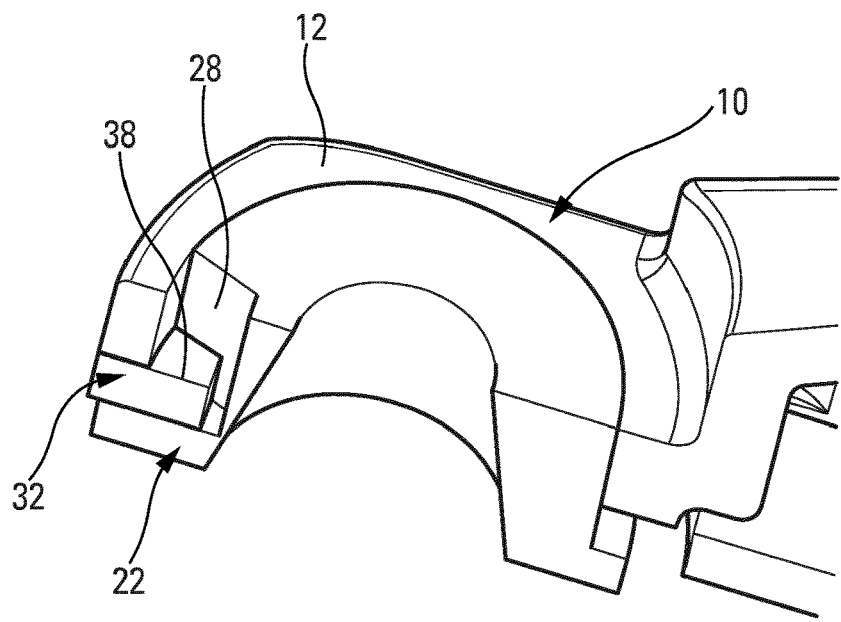

FIG. 8 illustrates the engagement in rotation of the insert 22 and the head 10. This engagement corresponds to a situation in which a torque value applied to the arms relative to the shaft is lower than a predetermined threshold. The engagement is carried out by the receipt of the tooth 38 of the slide 32 in the cavity 28 in the insert 22 according to a male-female assembly. When the shaft, not represented here, is rotating, it rotates the insert 22. Since the insert 22 is integral in rotation with the slide 32, the latter also rotates, and drives the head 10, and thus the wiper-holder arm and the wiper.

Figure 9:
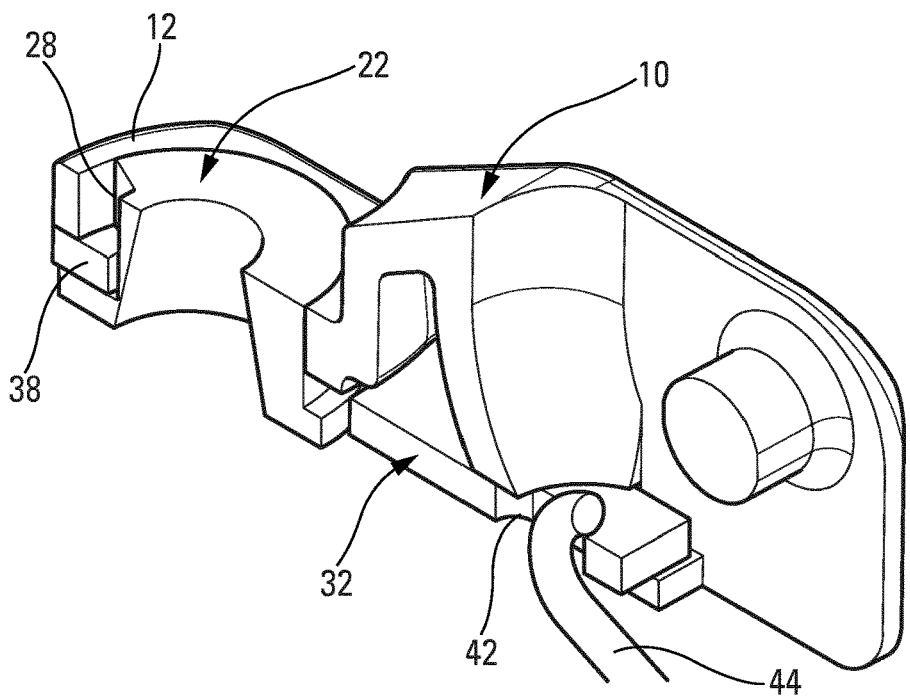
Figure 10:
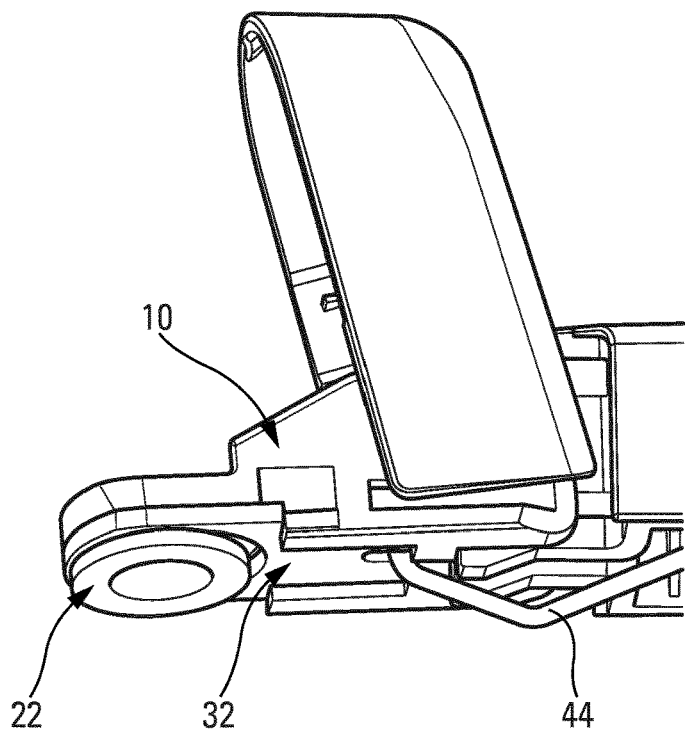
Figure 11:
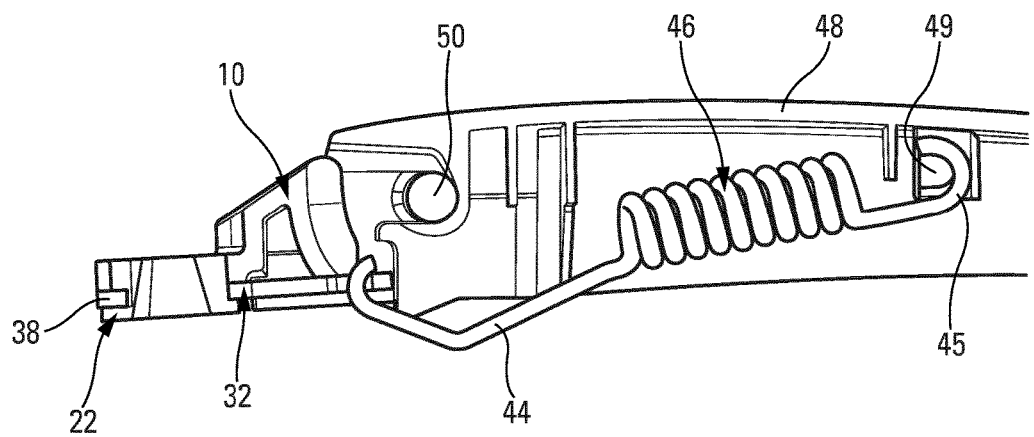
FIGS. 11 and 12 are views in cross-section according to the plane XI-XI and from above of the head, the insert and the slide assembled.
Figure 12:
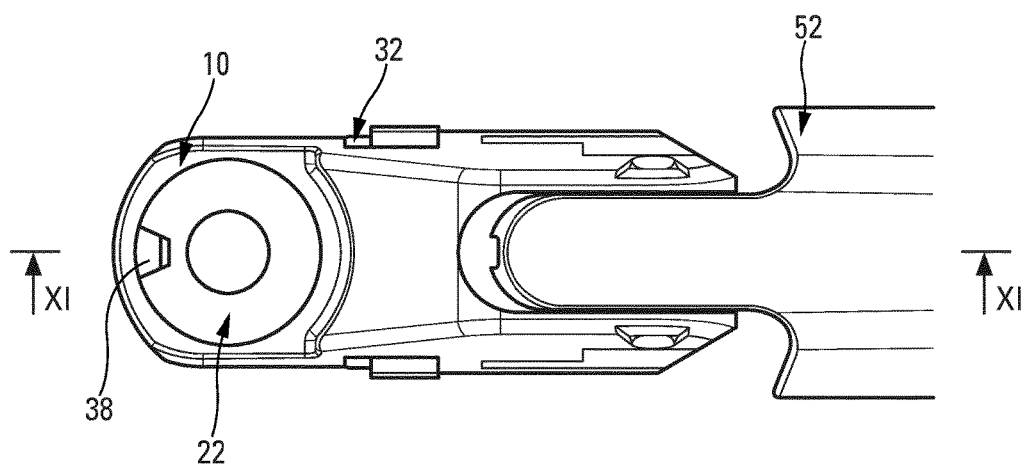

As illustrated in FIGS. 9, 10 and 11, the orifice 42 in the slide makes it possible to connect it to the wiper-holder arm 48 by means of a spring 46. This is carried out by means of an end 44 of the spring in the form of a hook which is hooked on the slide 32 via the orifice 42. An opposite end 45 of the spring, also in the form of a hook, is hooked on the wiper-holder arm 48. The wiper-holder arm 48 is connected to the head 10 by means of a shaft 50 which extends laterally in the orifices 20 in the head, and makes it possible to engage the head 10 and the arm 48. The spring exerts a return force which tends to retain the tooth 38 in the cavity 28 and the arm against the glass.

In addition, a protective housing 52 is added onto the wiper-holder arm 48.

Figure 13:
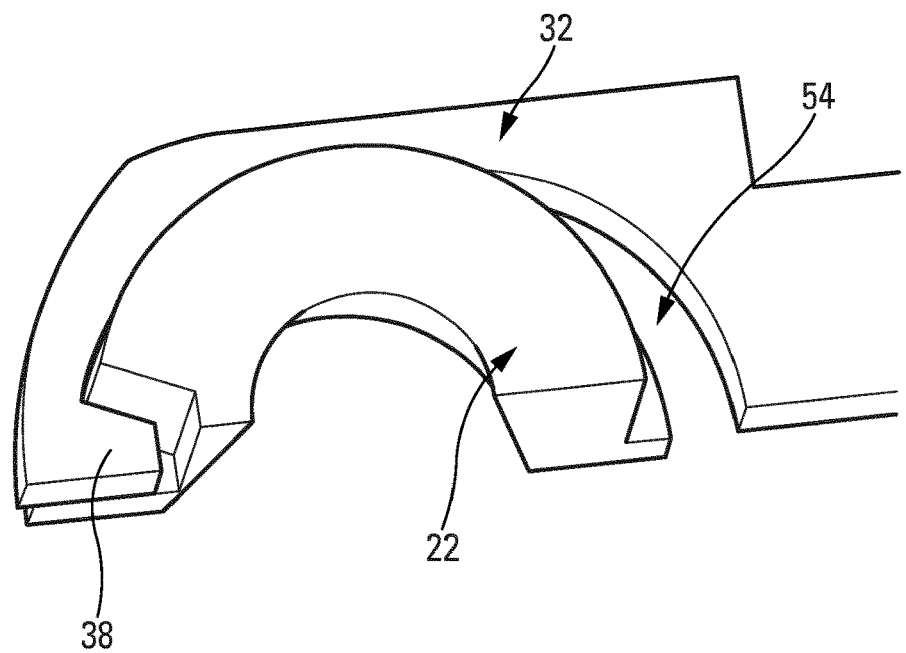
FIGS. 13 to 15 are views in cross-section and from above of the slide and the insert, illustrating the mechanism in the engaged and disengaged positions respectively.
Figure 14:
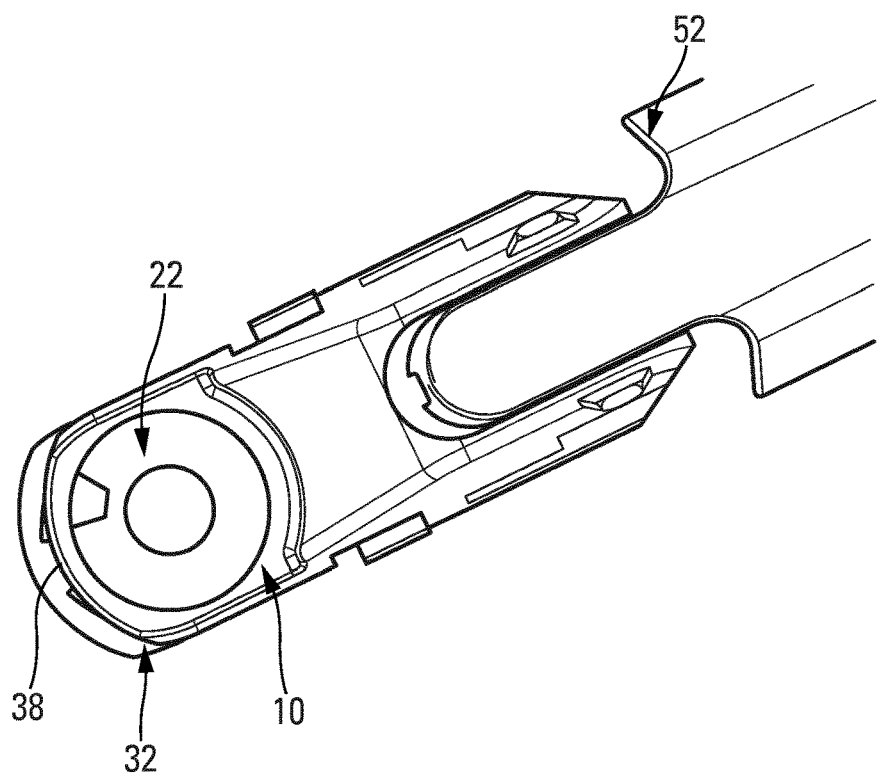
Figure 15:
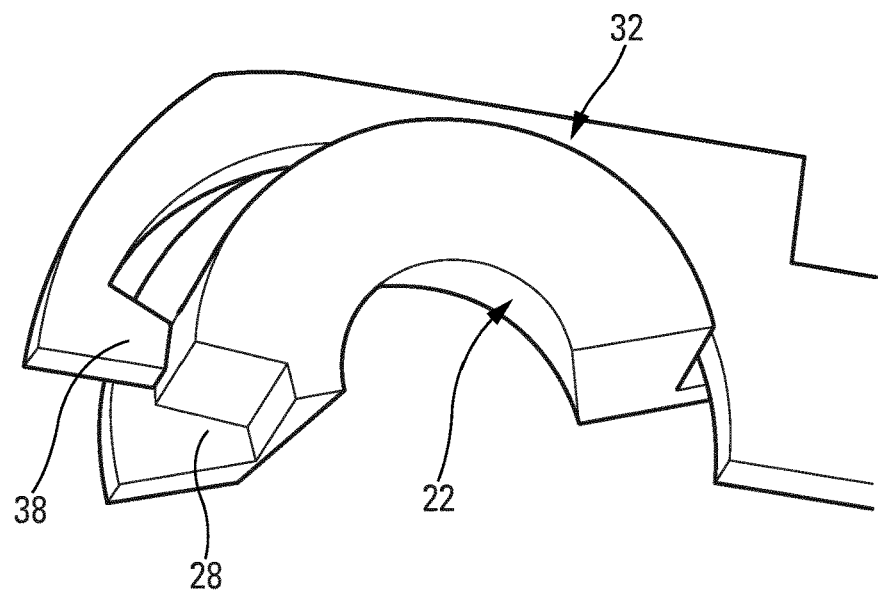

It should be noted, with reference to FIG. 13 in particular, that the diameter of the insert 22 is such that, when the tooth 38 of the slide 32 is accommodated in the groove 28 in the insert, an unoccupied space 54 persists between the insert and the slide, situated on the side of the insert opposite the tooth.

A description will now be provided with reference to FIGS. 4 and 11 to 15 of the functioning of the mechanism when the value of a torque applied around the axis on the arm relative to the shaft, hitherto lower than a predetermined threshold, exceeds this threshold. The mechanism will then assume its disengaged position.

For as long as the torque value is lower than the threshold, the drive mechanism is as illustrated in FIGS. 5 to 13.

Figure 4:
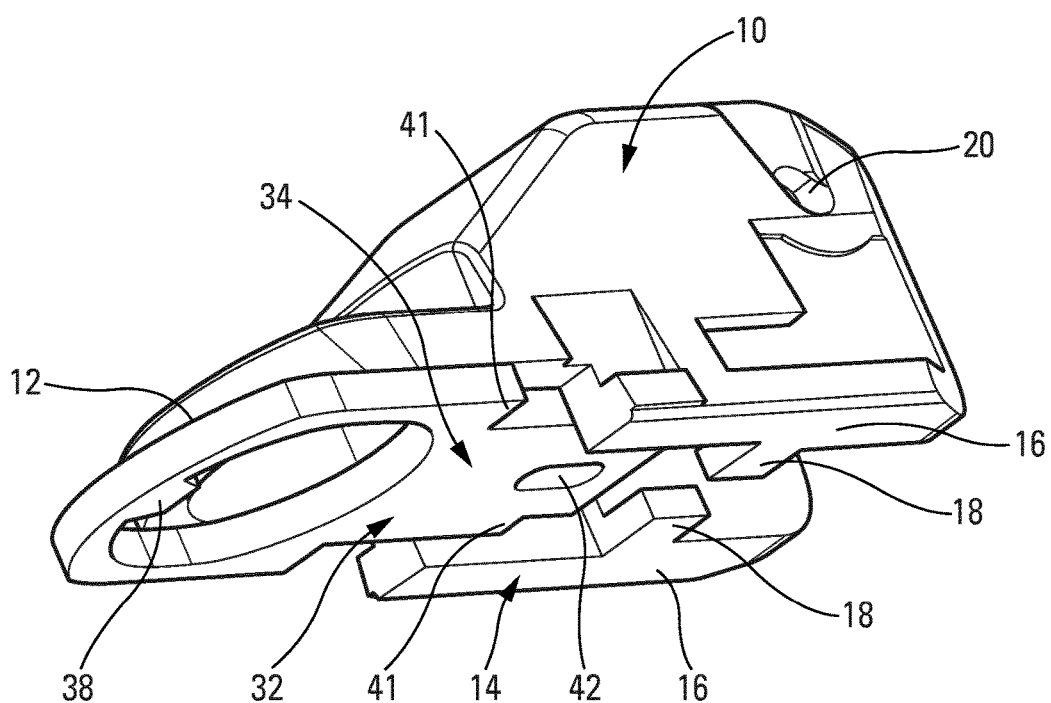
FIGS. 4 and 5 are views in perspective according to two different angles of the drive head and the slide assembled.

When the wiper system is at a standstill, and the torque value exceeds the threshold, the return force of the spring 46 is no longer sufficient to retain the tooth 38 in the cavity 28. Thus, by means of a ramp effect, the tooth 38 leaves the cavity 28, and the slide slides relative to the head against the return force exerted by the spring. As shown in FIG. 4, the shoulders 41 are free, and the tooth 38 of the slide exits from the cavity. This situation is illustrated in particular in FIGS. 14 and 15. The shaft remains integral with the coupling unit, which in this case is constituted by the insert 22. On the other hand, the insert 22 is no longer engaged by the tooth 38 of the slide 32 with the drive head 10. The wiper and the head then turn relative to the shaft and to the insert around the axis (XX').

When the system is functioning, and the torque value exceeds the threshold, the mechanism functions similarly. Upon completion of the disengagement, the shaft and the insert turn relative to the wiper and the head.

Thus, the slide 32 disengages the shaft and the arm in rotation when a value of a torque applied to the arm relative to the shaft is greater than the threshold, by sliding in the direction perpendicular to the axis. Upon completion of the sliding, the wiper system is disengaged, and no part has been damaged.

The user can then engage the wiper system once more by simple rotation of the arm, in order to reposition the tooth 38 in the groove 28. The return force of the spring 46 tends to make the slide slide, such that the tooth 38 is positioned in the groove.

Figure 16:
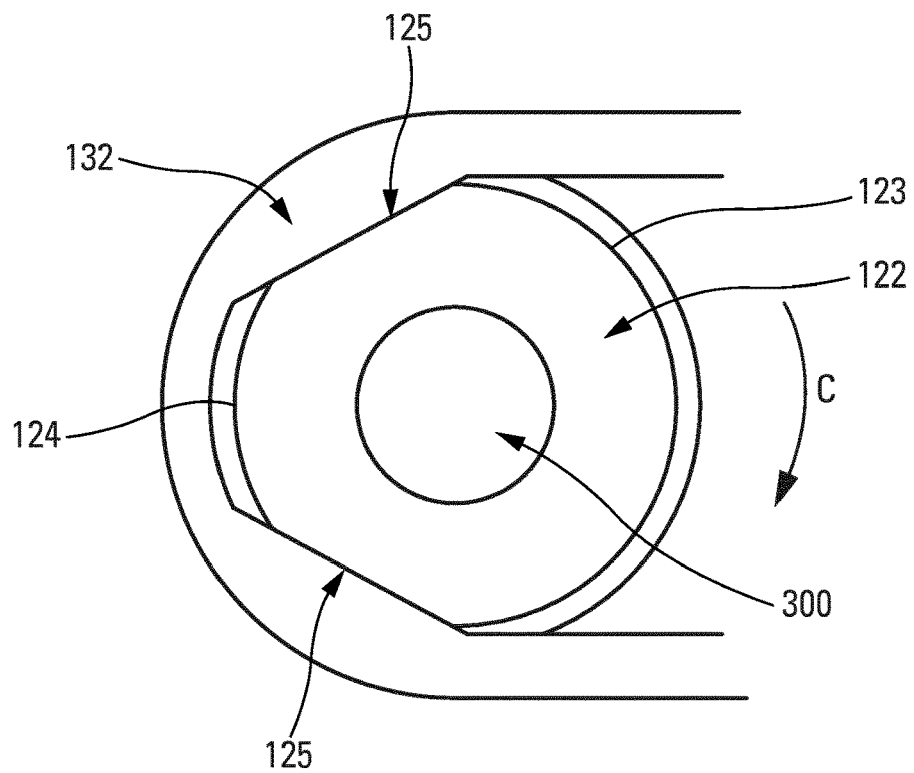
FIG. 16 is a view from above of an insert and a slide assembled according to a second embodiment.

A second embodiment will now be described with reference to FIG. 16. Only the differences from the preceding mode will thus be presented. The numerical references of similar elements will be increased by 100.

The cross-section of the insert 122, seen from above, this time has the form of a ring cut by two identical flat surfaces 125 which are symmetrical to one another, and extend on the same side of the disc. The edge of the slide 132 which forms the receptacle for receipt of the insert has a complementary cross-section with two flat faces which can come simultaneously into surface contact with the two faces 125, along the entire height of the insert. Thus, the coupling unit, in this case constituted by the insert 122, and the slide 132 form a male-female assembly which can give rise to the sliding of the slide 132 by means of a ramp effect. In addition, in this case it is the body of the insert 122 which carries out the coupling. The assembly is positioned on an output shaft 300 of the motor.

The mechanism functions in a manner similar to that of the first mode. When the return force of the spring is no longer sufficient to oppose a high torque on the system, the slide slides by means of a ramp effect in a direction perpendicular to an axis of the shaft, in order to disengage the insert and the head in rotation.

Figure 17:
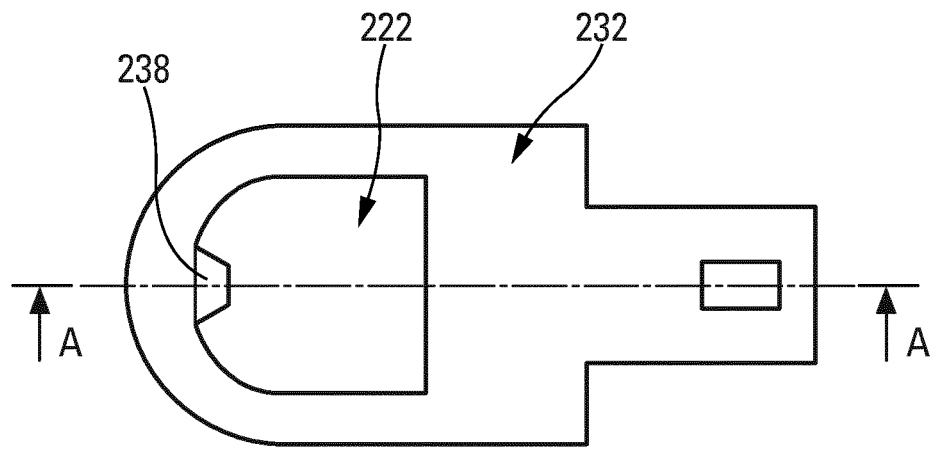
FIGS. 17 and 18 are respectively views from above and from the side of an insert and a slide according to a third embodiment.
Figure 18:
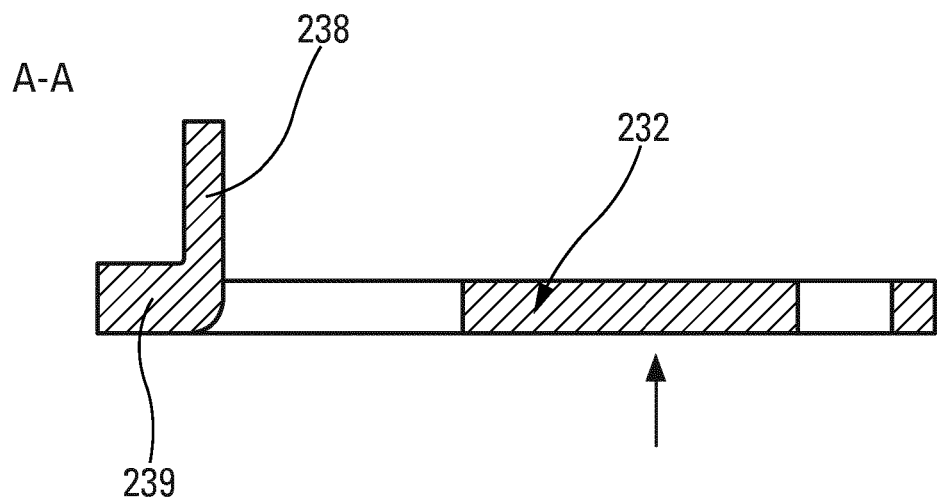

FIGS. 17 and 18 illustrate a third embodiment of the invention. Only the differences will be explained. The numerical references of similar elements will be increased by 100.

As previously, the slide 232 has two flat main faces as well as a relief 238 which extends from a front part 239 forming a receptacle for receipt of the shaft. On the other hand, in this case, the relief extends projecting perpendicularly to one of the main flat faces of the slide 232. This relief can penetrate in a groove with the same length in the insert or the shaft.

Figure 19:
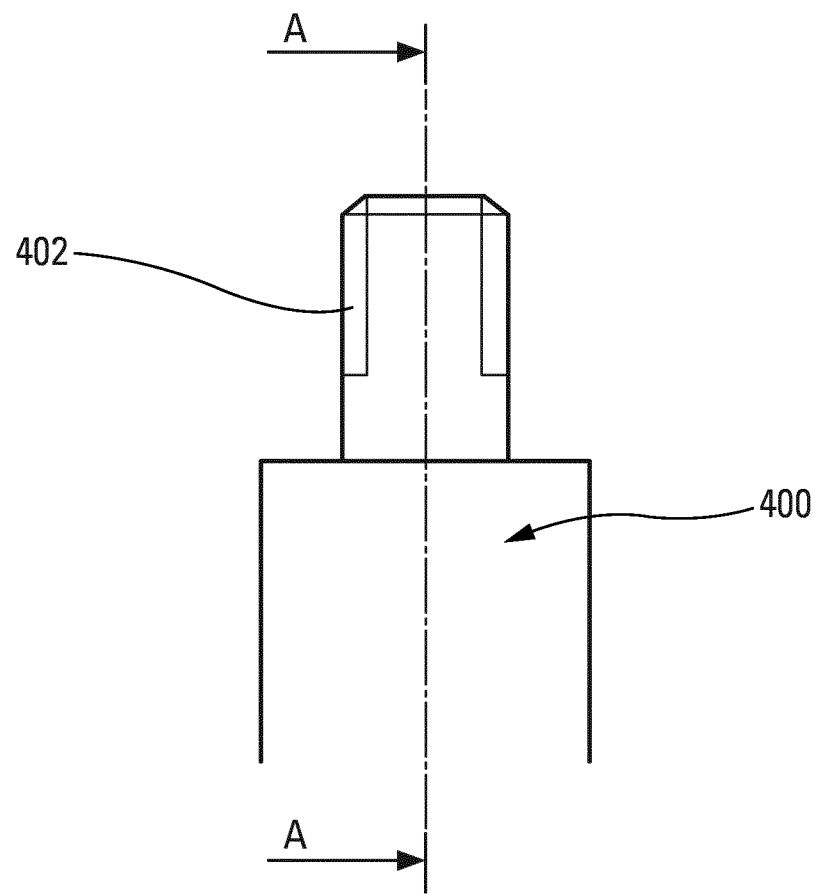
FIGS. 19 to 21 are views from the side and from above of a shaft according to a fourth embodiment.
Figure 20:
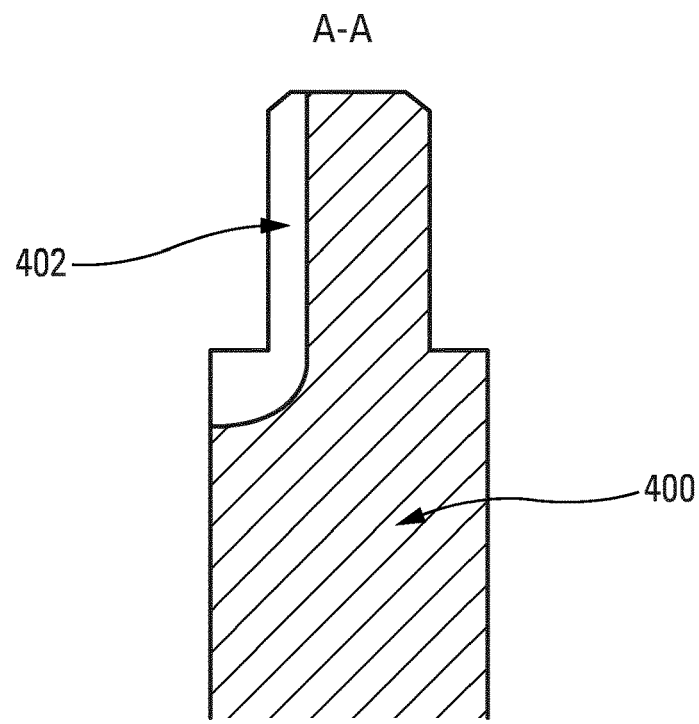
Figure 21:
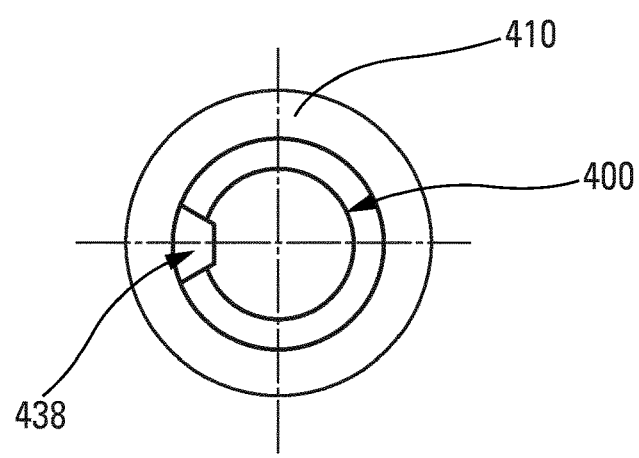

FIGS. 19 to 21 represent the invention according to a fourth embodiment. This mode has the particular feature that it does not require an insert in order to function. In fact, the shaft 400 of the motor forms the coupling unit. The shaft 400 is designed to receive the slide. For this purpose, it has a cavity 402 which is elongate according to a direction parallel to its axis. The slide has a coupling tooth 438. The pair formed by the cavity 402 and the tooth 438 has complementary profiles similar to those previously described, and engages the wiper-holder arm 410 and the shaft 400 in rotation. Thus, the output shaft of the motor is connected directly to the slide, without needing the presence of an insert.

Although the invention is described here according to four embodiments, these are in no way limiting, and different variants and modifications can be applied to it without however departing either from its context or its spirit.

For example, the tooth can be on the insert, and the cavity can be in the slide.

The invention claimed is:

1. A drive mechanism for a wiper system for a vehicle, comprising:
    a coupling unit;
    a drive head comprising means for connection to a wiper-holder arm; and
    a slide that engages the unit and the head in rotation when a torque value applied to the head relative to the unit is lower than a predetermined threshold, and disengages them in rotation in the opposite ease by sliding in a direction perpendicular to an axis of rotation of the unit,
    wherein the slide has a receptacle for receipt of the coupling unit.

2. The mechanism as claimed in claim 1, wherein the coupling unit and the slide form a male-female assembly configured to facilitate sliding of the slide by a ramp effect.

3. The mechanism as claimed in claim 1, wherein the unit comprises a main body configured to facilitate the sliding of the slide by a ramp effect.

4. The mechanism as claimed in claim 1, wherein the unit is formed by an insert which can be connected to a shaft of a motor.

5. The mechanism as claimed in claim 4, wherein either one of the unit and the slide has a relief and the other one of the unit and the slide has a cavity for receipt of the relief, the relief and the cavity having faces configured to facilitate the sliding of the slide by means of a ramp effect.

6. The mechanism as claimed in the claim 5 wherein the part which comprises the relief has a flat main face, with the relief extending projecting from this face according to the direction of the axis of rotation.

7. The mechanism as claimed in claim 5, wherein the insert contains the cavity.

8. The mechanism as claimed in claim 5, wherein the relief comprises a tooth.

9. A wiper system for a vehicle comprising:
    a drive motor;
    a wiper-holder arm; and
    a drive mechanism connecting the motor and the arm according to claim 1.

10. The wiper system as claimed in claim 9, wherein the slide is connected to the wiper-holder arm by a spring which tends to engage the unit and the slide in rotation.

11. The wiper system as claimed in claim 9, wherein the motor comprises an output shaft which forms the coupling unit.

12. A drive mechanism for a wiper system for a vehicle, comprising:
    a coupling unit;
    a drive head comprising means for connection to a wiper-holder arm; and
    a slide that engages the unit and the head in rotation when a torque value applied to the head relative to the unit is lower than a predetermined threshold, and disengages them in rotation in the opposite ease by sliding in a direction perpendicular to an axis of rotation of the unit,
    wherein the unit is formed by an insert which can be connected to a shaft of a motor, wherein either one of the unit and the slide has a relief and the other one of the unit and the slide has a cavity for receipt of the relief, the relief and the cavity having faces configured to facilitate the sliding of the slide by means of a ramp effect, and wherein the part which comprises the relief has a flat main face, with the relief extending projecting from this face according to the direction of the axis of rotation.

* * * * *